UNITED STATES PATENT OFFICE.

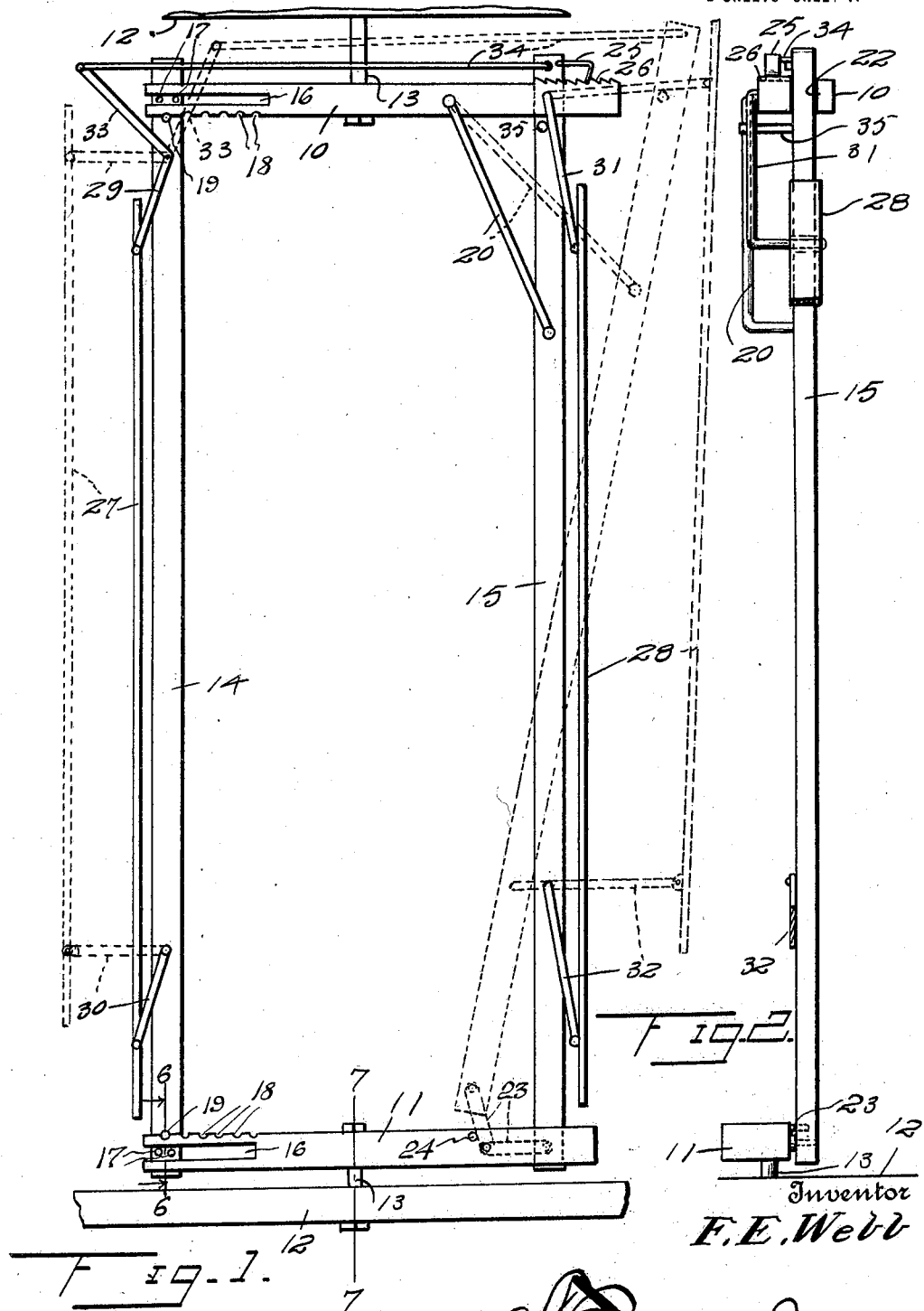

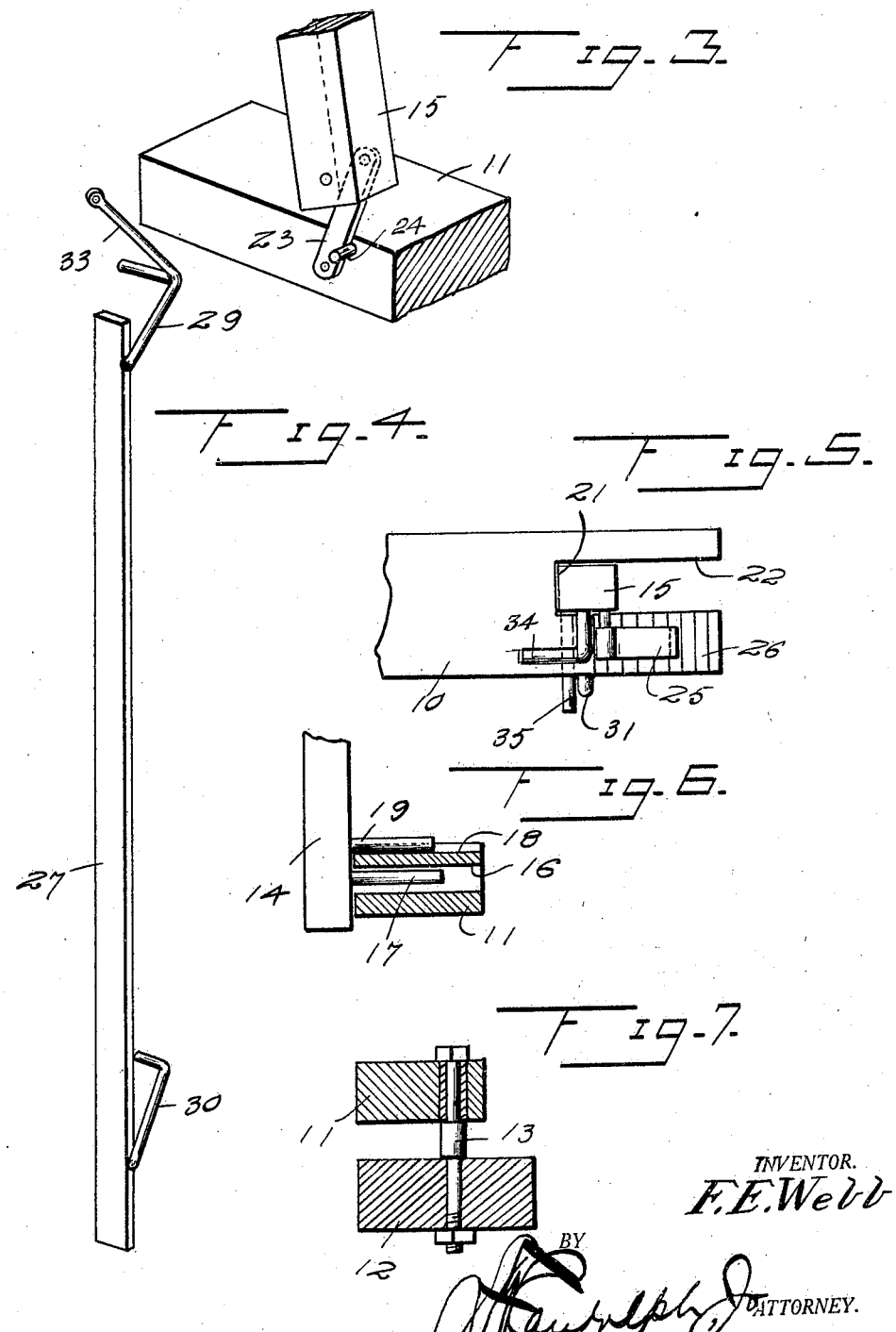

FRED E. WEBB, OF SYRACUSE, NEW YORK.

SELF-CLOSING STANCHION.

1,395,882. Specification of Letters Patent. Patented Nov. 1, 1921.

Application filed April 16, 1920. Serial No. 374,464.

*To all whom it may concern:*

Be it known that I, FRED E. WEBB, a citizen of the United States, residing at Syracuse, in the county of Onondaga and State of New York, have invented certain new and useful Improvements in Self-Closing Stanchions; and I do hereby declare the following to be a full, clear, and exact description of the invention, such as will enable others skilled in the art to which it appertains to make and use the same.

The object of the invention is to provide a relatively simple and comparatively inexpensive stanchion for cattle, wherein the closing of the same and the locking thereof in its closed position is effected by the animal in extending the head between the upright or side bars of the stanchion frame, and wherein the introduction of the head of the animal otherwise than in the proper relation to the side bars or uprights of the swinging frame is prevented, so that it is only necessary to adjust the stanchions in their open or receiving positions before driving the cattle into the barn, and the closing of the stanchions will be effected without further effort upon the part of the attendant; and with these objects in view the invention consists in a construction and combination of parts of which a preferred embodiment is shown in the accompanying drawings, wherein—

Figure 1 is a front view of the stanchion showing the same with its parts in full lines in the closed or retaining position and in dotted lines in the open or receiving position.

Fig. 2 is an edge view partly in section.

Fig. 3 is a detail view in perspective of the connection between one end of the adjustable upright or side bar and the cross head.

Fig. 4 is a detail view of one of the guard hangers.

Fig. 5 is a similar view of the upper end of the movable side bar or upright to show the means for locking the same in its closed or retaining position.

Fig. 6 is a section on the line 6—6 of Fig. 1, and

Fig. 7 is a section on the line 7—7 of Fig. 1.

The stanchion consists essentially of the upper and lower or top and bottom cross heads 10 and 11 which are centrally mounted in a suitable frame work 12 by means of pivots 13, and side bars or uprights 14 and 15 of which the former is adjustable bodily with relation to the upper and lower cross-heads, to vary the interval between the side bars or uprights to suit cattle of different sizes, and the other is movable relative to the cross heads and the upright or side bar 14 to permit of the introduction and removal of the head of the stock.

In the construction illustrated the extremities of the cross heads adjacent to the adjustable upright or side bar 14 are slotted as shown at 16 to receive guide pins 17 carried by the extremities of the said side bar or upright, and are notched or provided with a plurality of seats 18 for engagement by cross bolts 19 which are engaged with the upright or side bar to secure the latter in the desired position with relation to the cross head.

The movable side bar or upright 15 is suspended at its upper end from the upper cross head by means of a hanger 20 consisting of a link which is inclined inwardly toward its upper end so that the weight of the bar 15 tends to swing the lower end of the hanger inwardly until the upper end of said bar encounters a stop formed by a shoulder or wall 21 at the inner end of a slot 22 formed in the adjacent end of the upper cross head. The lower end of the movable side bar is connected with the lower cross head by means of a trip arm 23 adapted normally to occupy a substantially horizontal position when the bar is in a substantially vertical or upright position, and adapted when the upper end of said bar is drawn outwardly to the position indicated in dotted lines in Fig. 1, to swing upward by reason of the movement of the hanger 20, to assume the dotted line position also indicated in Fig. 1 where its movement is checked by a stop 24 on the lower cross head. The stop limits the movement of the trip arm to a position which is slightly inward of a vertical plane and it is held in contact with the stop pin by reason of the upward and outward inclination of the side bar as shown by the dotted lines in Fig. 1 and the tendency of said side bar due to the mounting of the hanger to move the upper end of the trip arm toward the center of the lower cross head.

In the dotted line or open position indicated in Fig. 1 the space between the uprights is such as to permit of the introduction of the head of the cattle, but upon being introduced the neck of the animal encounters the inner surface of the movable side bar at a point below the connection thereof with the lower end of the hanger and a very slight lateral pressure upon the bar is sufficient to throw the trip arm 23 over the center and permit it to drop to the full or closed lines position shown in Fig. 1 under the gravital influence of the side bar due to the swinging movement of the hanger. Thus while it is necessary in order to open the stanchion merely to draw the upper end of the movable side bar 15 outwardly as indicated by the dotted lines in Fig. 1 and whereas said bar will retain this open position by reason of the contact of the trip arm 23 with the stop 24, a very slight pressure or touch applied to the inner surface of the bar at any point below the pivotal connection thereof with the hanger 20 is sufficient to cause said bar to resume its normal or closed position indicated in full lines in Fig. 1.

Moreover at its upper end the movable side bar is preferably provided with a dog 25 adapted when said bar is in its normal or closed position to engage a tooth of a rack 26 carried by the upper side of the top cross head.

In order that the animal in approaching the stanchion may not insert its head into the space outside of that defined by the uprights 14 and 15 there are employed adjustable guard rods 27 and 28 adapted to be extended in opposite directions respectively from the uprights 14 and 15 when the stanchion is open and to fold into close contact or parallelism with said uprights when the movable bar is in its closed position. To this end upper and lower hangers 29 and 30, mounted upon the upright 14 and hangers 31 and 32 mounted upon the upper cross head and the movable side bar 15 are provided respectively for the guards 27 and 28, the upper hanger 29 being provided also with a crank arm 33 connected by a rod 34 with the upper end of the movable side bar 15, so that when the latter is swung outwardly to the dotted line position the guard 27 is extended, while carried by said movable upright 15 is a pin 35 for engagement with the hanger 31 to correspondingly extend the guard 28.

Thus as the stanchion is opened as hereinbefore described to permit of the entrance of the cattle the guards are simultaneously extended and remain in position to occupy the spaces between the side bars or uprights of the stanchions and the sides of the stall until by the action of the animal the stanchion is closed, whereupon the guards automatically fold into positions close to the planes of the side bars and thus do not interfere with the swinging or pivotal movement of the stanchion or with the movement of the animal retained thereby.

Having thus described my invention, what is claimed is:

1. A stanchion having upper and lower cross heads and spaced side bars or uprights one of which is movable relative to the other, a hanger connecting the movable side bar with the upper cross head at a point disposed inwardly of the plane of said bar, and a trip arm connecting the lower end of the said movable bar with the lower cross head for limited inward movement.

2. A stanchion having upper and lower cross heads and spaced uprights or side bars, one of which is movable toward and from the plane of the other, a downwardly and outwardly inclined hanger supporting the upper end of said movable upright or side bar from the upper cross head, a trip connecting the lower end of said upright or said side bar with the lower cross head for inward swinging movement as the upper end of said upright is moved outwardly, and a stop for limiting the inward swinging movement of said trip arm to a position slightly inwardly of a vertical plane.

3. A stanchion having pivotal cross heads and spaced uprights or standards which are respectively adjustable and movable relative to each other, the adjustable standard having guide pins mounted upon the cross head and bolts for engaging spaced seats or notches in said cross head, and the movable standard being connected with the upper cross head by a swinging hanger mounted inwardly of the plane of said standard and connected at its lower end with the lower cross head by a trip arm having a limited inward swinging movement.

4. A stanchion having upper and lower cross heads and uprights or side bars, one of which is movable toward and from the plane of the other, guard rods for extension in opposite directions from the planes respectively of said uprights or side bars and connected with the latter by hangers, a crank arm connected with a hanger of the guard rod carried by the upright or stanchion remote from said movable upright or side bar and connected with the latter, and an operating pin carried by the movable upright or side bar for engaging a hanger of the guard rod suspended adjacent thereto.

In testimony whereof I affix my signature in presence of two witnesses.

FRED E. WEBB.

Witnesses:
H. B. DONALDSON,
EDITH M. JACKSON.